United States Patent [19]

Kennedy et al.

[11] Patent Number: 5,225,492
[45] Date of Patent: Jul. 6, 1993

[54] LIVING CARBOCATIONIC POLYMERIZATION OF POLY(ISOBUTYLENE-BETA-METHYL VINYL ETHER)

[75] Inventors: Joseph F. Kennedy; Tibor Pernecker, both of Akron, Ohio; Béla Iván, Budapest, Hungary

[73] Assignee: The University of Akron, Akron, Ohio

[21] Appl. No.: 836,781

[22] Filed: Feb. 13, 1992

[51] Int. Cl.$^5$ .................... C08F 4/16; C08F 293/00; C08F 53/00
[52] U.S. Cl. .................................... 525/299; 525/268; 525/272
[58] Field of Search ............... 525/268, 269, 271, 272, 525/312, 299, 301

[56] References Cited

U.S. PATENT DOCUMENTS 4,835,220  5/1989  Bronstert et al. ............... 525/271

Primary Examiner—Jacob Ziegler
Attorney, Agent, or Firm—Oldham, Oldham & Wilson Co.

[57] ABSTRACT

The synthesis of poly(isobutylene-b-methyl vinyl ether) (PIB-b-PMeVE) by living carbocationic polymerization (LC⊕Pzn) employing the sequential monomer addition (SMA) technique is described. The process starts by producing the living PIB⊕ block employing the 2-chloro-2,4,4-trimethylpentane (TMPCl1/TiCl$_4$ initiating system in the presence of the common ion salt tetra-n-butylammonium chloride (n-Bu$_4$NCl) in CH$_3$Cl/n-C$_6$H$_{14}$ or CH$_2$Cl$_2$/n-C$_6$H$_{14}$ mixed solvents at $-80°$ C. and continues by the addition of methyl vinyl ether (MeVE). The second living block forms only in the presence of excess TiCl$_4$ suggesting that the species that starts the second block and subsequently sustains its growth is a MeVE·TiCl$_4$ complex. The stoichiometry of this complex (1:1 or 1:2) is uncertain. The TiCl$_4$ remains attached to the MeVE units after their incorporation into the diblock, however, it can be readily removed by water. PMeVE obtained in the presence of excess TiCl$_4$ degrades by dealcoholation, however, degradation is prevented by the use of n-Bu$_4$NCl. Various length (composition) diblocks have been prepared and characterized. The novel PIB-b-PmeVE's exhibit strongly amphiphilic character.

20 Claims, 5 Drawing Sheets

LIVING CARBOCATIONIC POLYMERIZATION OF POLY(ISOBUTYLENE-BETA-METHYL VINYL ETHER)

TECHNICAL FIELD

This invention relates to the synthesis of poly(isobutylene-b-methyl vinyl ether), hereinafter (PIB-b-PMeVE) by living carbocationic polymerization employing the sequential monomer addition technique.

BACKGROUND OF THE INVENTION

Living carbocationic polymerization (LC⊕Pzn) of olefins (e.g., isobutylene, styrene, various styrene derivatives) coupled with sequential monomer addition has resulted in a variety of new potentially useful materials including narrow molecular weight dispersed homopolymers, macromonomers, blocks, and networks.

One of the challenges in this field, is the synthesis of thermoplastic elastomers, specifically triblocks (or three-armed stars) comprising a soft (rubbery) center block flanked by hard (or glassy) outer blocks. Typically, the soft rubbery block is polyisobutylene and the hard glassy outer block is polystyrene or polyindene or derivatives thereof. In regard to these thermoplastic elastomers, the critical synthesis step is the quantitative and rapid crossover from the first polyisobutylene (PIB⊕) block to styrene (St) or styrene derivative:

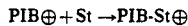

PIB⊕ + St → PIB-St⊕

Because of the similar stability/reactivity of the olefinic monomers involved, these crossovers proceed without much difficulty.

A most desirable feature, which has not heretofore been achieved by LC⊕Pzn is the one-pot synthesis of amphiphilic diblocks, i.e., A-B blocks in which a hydrophobic block (e.g., PIB) is bonded to a hydrophilic (e.g., poly (methyl vinyl ether) (PMeVE)) block. Such amphiphilic blocks are potentially useful emulsifying or blending agents, detergents, viscosifiers. The synthetic challenge is to develop conditions under which the

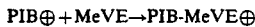

PIB⊕ + MeVE → PIB-MeVE⊕ crossover occurs quantitatively and rapidly, and desirable molecular weight PMeVE blocks are attained.

SUMMARY OF THE INVENTION

It is an object of this invention to devise a the one-pot synthesis of amphiphilic diblocks by LC⊕Pzn, i.e., A-B blocks in which a hydrophobic block (e.g., PIB) is bonded to a hydrophilic (e.g., PMeVE) block.

It is another object of this invention to describe the LC⊕Pzn synthesis of a novel amphiphilic diblock comprising an olefin and an alkyl vinyl ether by a one-pot sequential monomer addition technique.

It is a third object of this invention to detail a novel composition of matter of a well-defined amphiphilic diblock.

It is a fourth object of this invention to detail a novel composition of matter of well-defined molecular weight and molecular weight distribution of an A-B diblock in which a hydrophobic block is bonded to a hydrophilic block.

It is a fifth object of this invention to detail a novel composition of matter of a well-defined molecular weight and molecular weight distribution of an A-B diblock in which the hydrophobic block is polyisobutylene and the hydrophilic block is poly(methyl vinyl ether).

These and other objects of this invention will be evident when viewed in light of the drawings, detailed description, and appended claims.

DETAILED DESCRIPTION OF THE DRAWINGS

FIG. 1 is a gel permeation chromatograph trace of the following products, all made at $-80°$ for 90 minutes: (1) polyisobutylene; (2) poly(isobutylene-b-methyl vinyl ether); (3) TMPCl/TiCl$_4$/n-Bu$_4$NCl/MeVE/CH$_3$Cl/n-C$_6$H$_{14}$; and (4) "H$_2$O"/TiCl$_4$/n-Bu$_4$NCl/MeVE/CH$_3$Cl/ n-C$_6$H$_{14}$. The experimental conditions under which the polymerizations were conducted were:

| (1) | [TMPCl] = | $3 \times 10^{-4}$ mole |
| | [TiCl$_4$] = | $3.6 \times 10^{-3}$ mole |
| | [n-Bu$_4$NCl] = | $1.6 \times 10^{-mole}$ |
| | [IB] = | $2.5 \times 10^{-2}$ mole at $-80°$ C. |
| | Time = | 8 min. |
| | $\overline{M}_n$ = | 4800 |
| | $\overline{M}_w/\overline{M}_n$ = | 1.16 |
| (2) | after blocking with [MeVE] | |
| | [MeVE] = | $3.1 \times 10^{-2}$, 90 min. |
| | $\overline{M}_n$ = | 5600 |
| | $\overline{M}_w/\overline{M}_n$ = | 1.27 |
| (3) | $\overline{M}_n$ = | 750 |
| (4) | $\overline{M}_n$ = | 960 |

| Step 1: | CH$_2$Cl$_2$/n-C$_6$H$_{14}$ = | 60/40 v/v |
| | [n-Bu$_4$NCl] = | $3.9 \times 10^{-3}$ mole |
| | [TMPCl] = | $9.3 \times 10^{-4}$ mole |
| | [IB] = | $4.88 \times 10^{-2}$ mole |
| | [TiCl$_4$] | $1.17 \times 10^{-2}$ mole at $-80°$ C., 8 min. |
| Step 2: | [MeVE] = | $1.19 \times 10^{-1}$ mole |
| Step 3: | [TiCl$_4$] | $1.16 \times 10^{-2}$ mole added 10, 140, 150, 160, 170, and 180 min. after MeVE addition |

Figure 5:
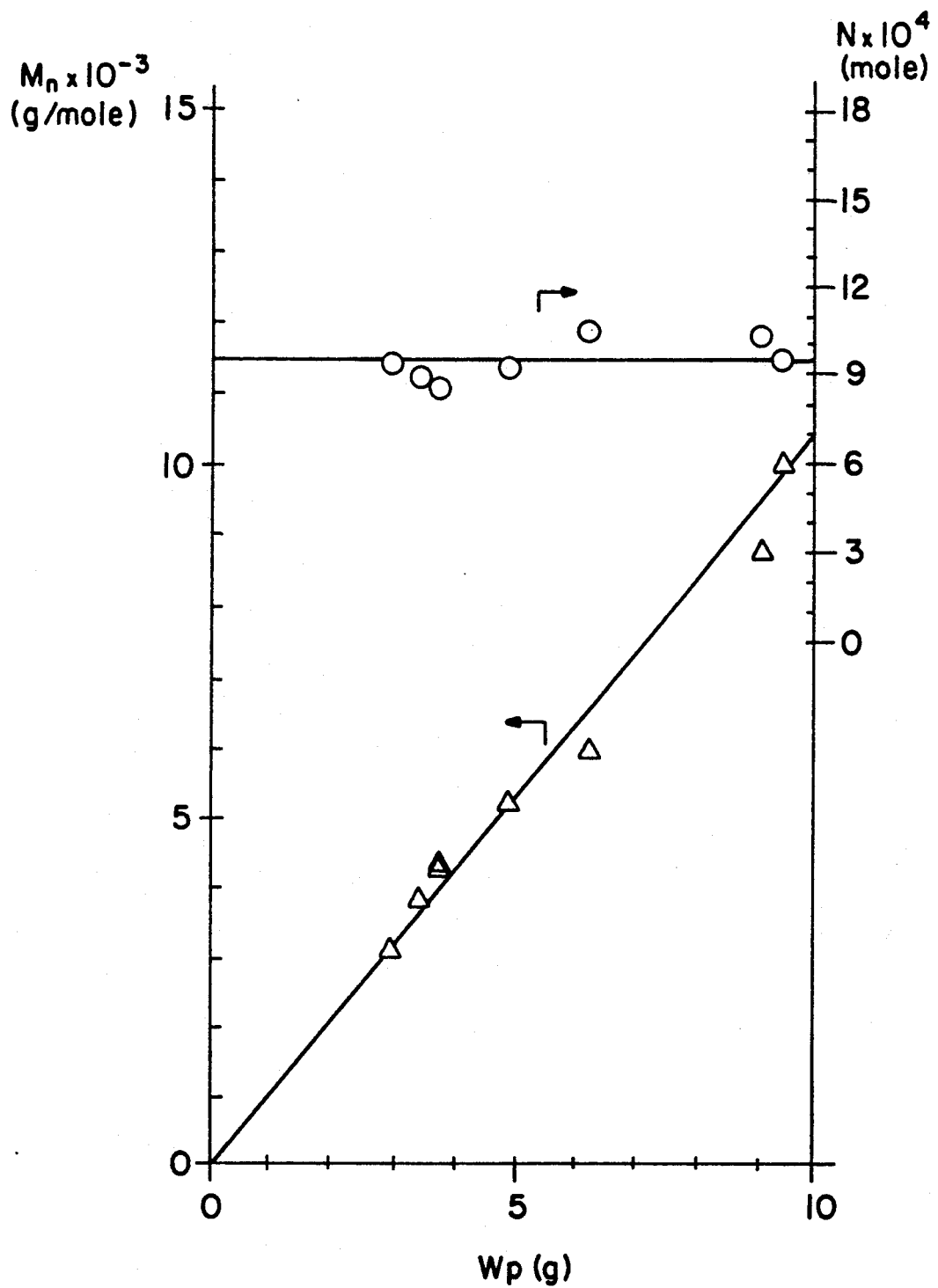

FIG. 5 is $\overline{M}_n$ vs. $W_p$ (g) for a living block copolymerization of isobutylene and methyl vinyl ether.

Figure 6:
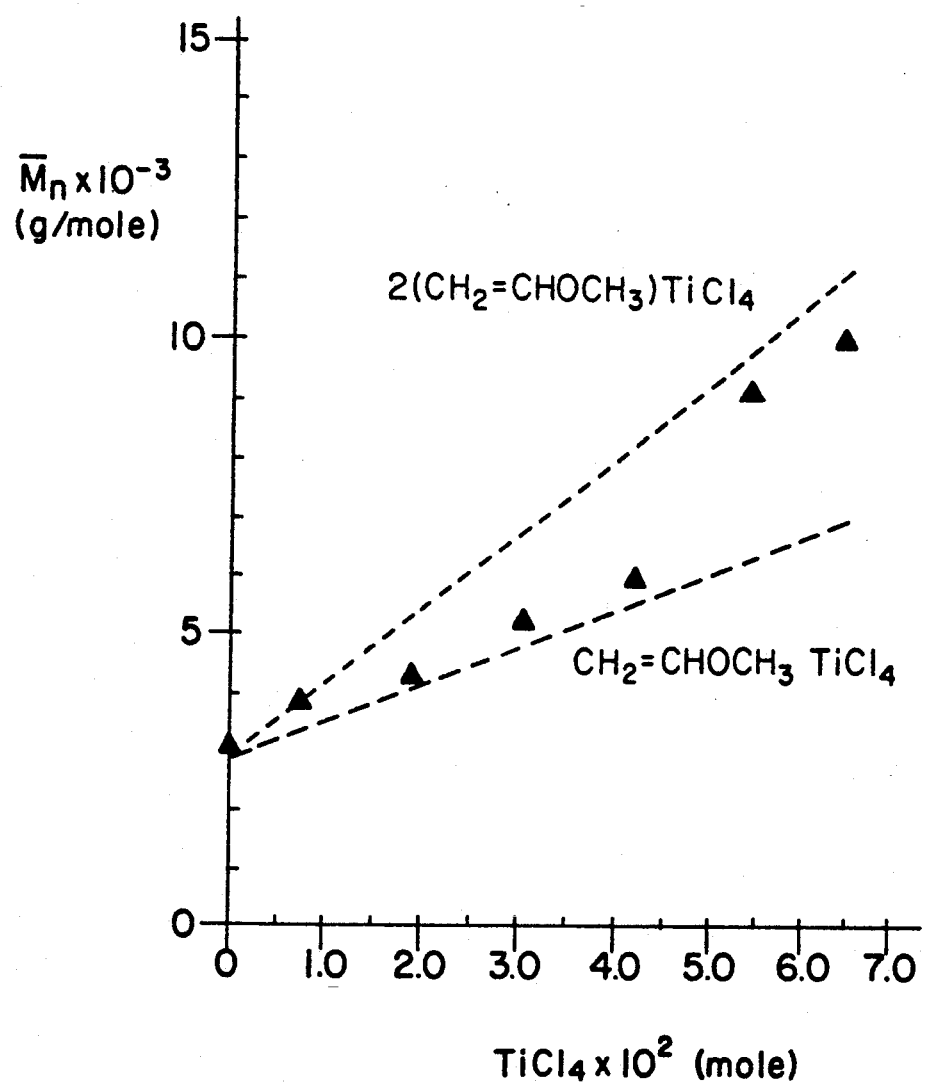

FIG. 6 is $\overline{M}_n$ vs. [TiCl$_4$] added for the block copolymerization of isobutylene and methyl vinyl ether.

LIST OF ABBREVIATIONS

DtBP—di-tert-butylpyridine
DMA—dimethylacetamide
IB isobutylene
LC⊕Pzn—living carbocationic polymerization
M$_n$—weight average molecular weight
M$_w$—weight average molecular weight
n-Bu$_4$NCl—tetra-n-butylammonium chloride
n-C$_6$H$_{14}$—n-hexane
PIB—polyisobutylene PIB-b-PMeVE—poly(isobutylene-b-methyl vinyl ether)
PMeVE—poly (methyl vinyl ether)
PRVE—poly (alkyl vinyl ether)
PS—polystyrene
RVE—alkyl vinyl ether
SMA—sequential monomer addition
St—styrene
TMPCl—2-chloro-2,4,4-trimethylpentane
TPE—thermoplastic elastomer
$W_p$—weight of product

DETAILED DESCRIPTION OF THE INVENTION

Reactants

The solvents (methyl chloride, methylene chloride and n-hexane), monomer activator (TiCl$_4$), and monomer (isobutylene, IB) were purified by standard means. TMPCl was obtained by hydrochlorination of 2,4,4-trimethyl-1-pentene, and vacuum distilled before use. Methyl vinyl ether (Aldrich Chemical Co.) was condensed prior to use. The quaternary ammonium salt n-Bu$_4$NCl (American Tokyo Kasei) was used as received.

Process Conditions

Polymerizations were carried out in a drybox under a dry nitrogen atmosphere by the use of large (75 ml) culture tubes or round bottom flasks (200 ml). The equipment including the cooling assembly have been described in U.S. Pat. No. 4,910,261, which is hereinby incorporated by reference. The reactors were usually filled in the following order: solvent mixture, initiator, monomer and if used, n-Bu$_4$Cl. The polymerization was started by the addition of TiCl$_4$. The n-Bu$_4$NCl was dissolved in CH$_2$Cl$_2$, usually 4.3 g in 50 ml CH$_2$Cl$_2$.

In the experiments where the first step was the synthesis of the living PIB block, the procedure was essentially identical to that described in earlier patents (e.g. U.S. Pat. Nos. 4,910,321, 4,910,261, 4,929,683, and 5,066,730 which are hereinby incorporated by reference).

The second step was the addition of MeVE. The condensed prechilled monomer was added to the charge under constant agitation. Upon such addition, the charges immediately turn straw yellow, indicating the formation of MeVE·TiCl$_4$ complexes. The yellow color is believed to be characteristic of TiCl$_4$ complexes of MeVE and PMeVE. The color persists throughout the living polymerization but immediately disappears upon MeOH addition.

Purification

The purification and analysis of the PIB segment has been described and is now a routine procedure (e.g. U.S. Pat. No. 4,910,321, 4,910,261, 4,929,683, and 5,066,730 which are hereinby incorporated by reference).

The isolation of PIB-b-PMeVE is cumbersome due to its amphiphilic nature. After quenching the blocking reaction with MeOH, emulsions are obtained which remain even after dilution with excess MeOH and/or H$_2$O. The emulsions persist on heating (to reflux) or diluting with aqueous saline solutions. The procedure used for the isolation of these amphiphilics includes evaporating the solvents and traces of residual monomer, dissolving the products in CCl$_4$, washing repeatedly with water/methanol (80/20 v/v) mixtures, separating the organic layers, and removing the solvents by evaporation or rotavap techniques. The products are dried at room temperature in vacuo. The legends of the figures and tables give additional detailed concentrations and conditions.

Molecular Weight

Molecular weights and molecular weight distributions were obtained by a Waters high pressure GPC assembly. The equipment and analysis procedure for PIB have been described in U.S. Pat. No. 4,910,261 which is hereinby incorporated by reference. The $\overline{M}_n$'s were obtained with a PIB calibration curve constructed with a set of narrow molecular weight distribution ($\overline{M}_w = 1.05$–$1.1$) PIBs. This calibration curve was also used for $\overline{M}_n$ determination of PIB-b-PMeVE; thus of $\overline{M}_n$ values for the diblock are approximations.

Analytical Spectra

The $^1$H and $^{13}$C NMR spectra were taken on a Varian 200 MHz spectrometer using CDCl$_3$ as the solvent. The composition of the diblocks was calculated by comparing the proton resonance intensities obtained for —OCH$_3$, and—the CH— in the PMeVE segment, and —CH$_3$ protons in the PIB segment.

DETAILED DESCRIPTION

The crossover reaction of polyisobutylene with methyl vinyl ether,

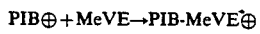

is energeticaly favorable. A series of experiments were carried out in which MeVE was added to the living PIB⊕ blocks under a great variety of conditions and the products analyzed for block formation. While the first step, i.e., the synthesis of the living PIB⊕, is a routine operation (as ascertained by conversion, $\overline{M}_n$, and $\overline{M}_w/\overline{M}_n$ data), the second step, i.e., the addition of MeVE, invariably has led to ill-defined products (i.e., bimodal distributions, molecular weights lower than those of the starting PIB block, severe discoloration). Control experiments in which MeVE was polymerized by TMPCl/TiCl$_4$ or BCl$_3$ in the absence or presence of electron donors (e.g., dimethylacetamide (DMA)) and-/or proton traps (i.e., di-tert-butylpyridine (DtBP)) gave discolored UV-active products of bi-, or multimodal dispersities with molecular weights far lower than expected in a living process. Under the same conditions IB yields well-defined, narrow-distribution ($\overline{M}_w/\overline{M}_n = 1.1$–$1.2$) product by living polymerization.

For example, the systems TMPCl/TiCl$_4$ or BCL$_3$/DMA/MeVE/DtBP/CH$_3$Cl:n-C$_6$H$_{14}$ (60:40) in the $-40°$ C. to $-80°$ C. range gave brown, violet, or black liquids with at least bimodal distributions.

While not wishing to be bound by theory, it is speculated that the discoloration and appearance of UV activity in Friedel-Crafts acid-induced alkyl vinyl ether polymerizations was due to dealcoholation as shown in the following reaction schematic.

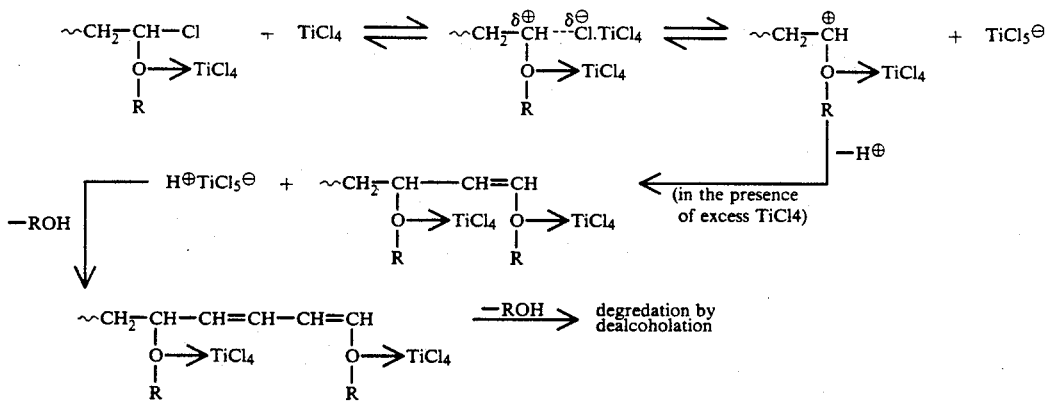

Similar to the proposition developed for living IB polymerization, excess TiCl$_4$-induced alkyl vinyl ether polymerizations may also rapidly produce chlorine-terminated polymer in equilibrium with a hypothetical living species (stretched polarized covalent bond) which in turn is in equilibrium with the ionic entity leading to conventional polymerization. In the presence of excess TiCl$_4$, the equilibria are pushed by mass law action toward the ionic species which inevitably deprotonate and lead to dealcoholation. Proton loss in the poly(alkyl vinyl ether) system gives rise to an allylic alcohol substituent which, due to complexation with TiCl$_4$, undergoes rapid repetitive dealcoholation and thus leads to a sequence of conjugated double bonds.

According to this hypothesis, the main difficulty in synthesizing olefin-alkyl vinyl ether blocks by SMA is the inherent instability of the —Cl terminus of the poly-(alkyl vinyl ether) block in the presence of strong Friedel-Crafts acids. In other words, the desirable and rapid $$PIB\oplus + RVE \rightarrow PIB\text{-}RVE\oplus$$

crossover and subsequent alkyl vinyl ether (RVE) polymerization does occur, however, as soon as the poly(alkyl vinyl ether) (PRVE) block arises, rapid degradation by dealcoholation commences.

While the example described above utilizes TiCl$_4$ as the monomer activator, there is no reason to limit the class of activators to such. It is anticipated that other Friedel-Crafts halides would react similarly. Without being limited to such, exemplary of this type of activator would be BCl$_3$, SnCl$_4$, SbCl$_5$, BBr$_3$, TiBr$_4$, SnBr$_4$ and SbBr$_5$. Additionally, alkyl aluminum moieties such as monoalkyl aluminum dihalides, dialkyl aluminum halides, and trialkyl aluminum compounds, represented generically as R$_x$AlX$_{(3-x)}$ are envisioned to be within the scope of this invention, as are quaternary ammonium transition metal salts as envisioned by the generic formula R$_4$N$\oplus$MtX$\ominus_{(n+1)}$, wherein R can be alkyl alkenyl, aryl, alkaryl, aralkyl, cycloalkyl moieties and cycloalkyl radicals, and R is the same or different, Mt is a transition metal, X is a halide selected from the group consisting of chloride and bromide, $x$ is an integer from 1 to 3, and $n$ is an integer sufficient to satisfy the valence of the transition metal. Specifically, it is envisioned that one example of a quaternary ammonium transition metal salt would be n-Bu$_4$N$\oplus$TiCl$_5\ominus$.

One aspect of the present invention lies in the ability to avoid dealcoholation by reducing the ionicity of the system. Through a series of experiments, it has been shown that PMeVE degradation is prevented by the addition of n-Bu$_4$NCl, a common anion salt to the living charge. It is known that n-Bu$_4$NCl rapidly and quantitatively interacts with TiCl$_4$ $$\text{n-Bu}_4\text{NCl} + \text{TiCl}_4 \rightarrow \text{n-Bu}_4\oplus = \text{TiCl}_5\ominus$$

and that the common anion TiCl$_5\ominus$ reduces the ionicity of the system.

While the specific example details the use of a quaternary ammonium salt, there is no reason to limit the invention to such. It is anticipated that organic phosphonium compounds would also work. Additionally, while the alkyl group shown in the example is n-butyl, it is envisioned that other alkyl groups would be effective. Exemplary of such contemplated alkyl groups are straight chain and/or branched C$_1$–C$_{16}$ alkyl or alkenyl moieties, aryl, alkaryl, aralkyl, or cycloalkyl moieties and cycloalkyl radicals. While it is typically the case that R$_1$–R$_4$ are the same, this is usually done for the sake of cost. There is no reason to be limited to such, and it is envisioned that R$_1$–R$_4$ could all be different. Also anticipated within the scope of this invention is the situation where one, two or three of the alkyl groups are the same, while the remaining alkyl group(s) are different, or any variation on this basic concept.

Figure 1:
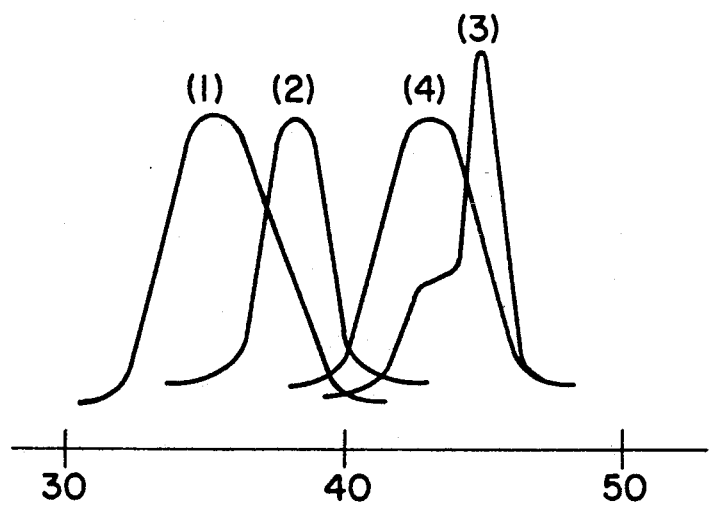

As indicated in FIG. 1, a set of representative GPC traces of products was obtained in the presence of n-Bu$_4$NCl under the detailed conditions and data provided in the legend. Specifically, trace (1) shows the PIB block and (2) that of the PIB-b-PMeVE; traces (3) and (4) are PMeVE controls obtained by initiation with TMPCl/TiCl$_4$ and "H$_2$O"/TiCl$_4$, respectively, but otherwise under the same conditions as the other blocks. Significantly, the GPC trace of the PIB block is symmetrical and narrow, and is centered at a higher retention time (lower molecular weight) than that of the PIB-b-PMeVE. The traces of the PMeVE controls are at much lower molecular weights. The position of the shoulder in trace (3) indicates that the PMeVE control produced by TMPCl was contaminated by PMeVE due to moisture (H$_2$O). Importantly, all the products were colorless and UV inactive indicating the absence of degradation (dealcoholation).

EXAMPLES

A set of experiments were designed to probe the effect of polymerization time and MeVE concentration on diblock molecular weight.

EXAMPLE 1

A series of 6 reactors with living PIB⊕ blocks were prepared. A quantity of MeVE was added pursuant to column 1 in Table I, and the polymerizations were quenched after various times (from 0.17 to 18 hours).

EXAMPLE 2

In a companion set of experiments (Table II), various quantities of MeVE (from 0 to 0.06 mole) were added to living PIB blocks and quenched after various times. A procedure similar to that employed in Example 1 was used.

TABLE I

Molecular Weight of the Diblock vs. Time

| | MeVE × $10^{-2}$ (mole) | PZN time (hrs) | $W_p$ (g) | $\overline{M}_n$ | $\overline{M}_w/\overline{M}_n$ | N × $10^4$** |
|---|---|---|---|---|---|---|
| Control | — | 0.17 | 1.193 | 4800 | 1.16 | 2.47 |
| 1 | 6.1 | 0.17 | 1.274 | 5200 | 1.16 | 2.45 |
| 2 | 6.1 | 1.5 | 1.329 | 5200 | 1.27 | 2.55 |
| 3 | 6.1 | 3.0 | 1.401 | 5400 | 1.40 | 2.59 |
| 4 | 6.1 | 6.0 | 1.473 | 5300 | 1.37 | 2.78 |
| 5 | 6.1 | 9.0 | 1.521 | 5400 | 1.42 | 2.81 |
| 6 | 6.1 | 18.0 | 1.371 | 5500 | 1.38 | 2.49 |

| | |
|---|---|
| [TMPCL] = | 2.7 × $10^{-4}$ mole |
| [n-Bu$_4$NCl] = | 1.7 × $10^{-3}$ mole |
| [IB] = | 2.5 × $10^{-2}$ mole |
| [TiCl$_4$] = | 3.4 × $10^{-3}$ mole in CH$_3$Cl/n-C$_6$H$_{14}$ (60/40 v/v) at −80° C. |
| Time = | 8 minutes |
| Total volume = | 20 ml |
| **N = | $W_p/\overline{M}_n$ |

TABLE II

Molecular Weight of the Diblock vs. [MVE]

| | MeVE × $10^{-2}$ (mole) | PZN time (hrs) | $W_p$ (g) | $\overline{M}_n$ | $\overline{M}_w/\overline{M}_n$ | N × $10^4$** |
|---|---|---|---|---|---|---|
| control | — | 0.17 | 1.254 | 4900 | 1.32 | 2.56 |
| 7 | 1.5 | 1.5 | 1.312 | 5400 | 1.36 | 2.43 |
| 8 | 3.0 | 1.5 | 1.361 | 5300 | 1.42 | 2.57 |
| 9 | 6.1 | 18.0 | 1.371 | 5500 | 1.38 | 2.49 |

| | |
|---|---|
| [TMPCL] = | 2.7 × $10^{-4}$ |
| [n-Bu$_4$NCl] = | 1.8 × $10^{-3}$ |
| [IB] = | 2.5 × $10^{-2}$ |
| [TiCl$_4$] = | 3.5 × $10^{-3}$ in CH$_2$Cl$_2$/n-C$_6$H$_{14}$ (60/40 v/v) at −80° C |
| Time = | 8 minutes |
| Total vol. = | 20 ml |
| **N = | $W_p/\overline{M}_n$ |

According to the results in tables I and II, neither MeVE concentration nor time affects the amounts of diblock formed or its molecular weight. Importantly, a comparison of the results with the PIB controls (i.e., charges in which MeVE was absent) shows that a small measure of MeVe blocking did occur, and that the PMeVE blocks grew only a few monomer units (i.e., from ~4800 to ~5300 g/mol or about nine units). Significantly, the number of moles of product, N, remained constant and blocking efficiencies (i.e.,N/[TMPCl]) were close to quantitative in these experiments.

Figure 2:
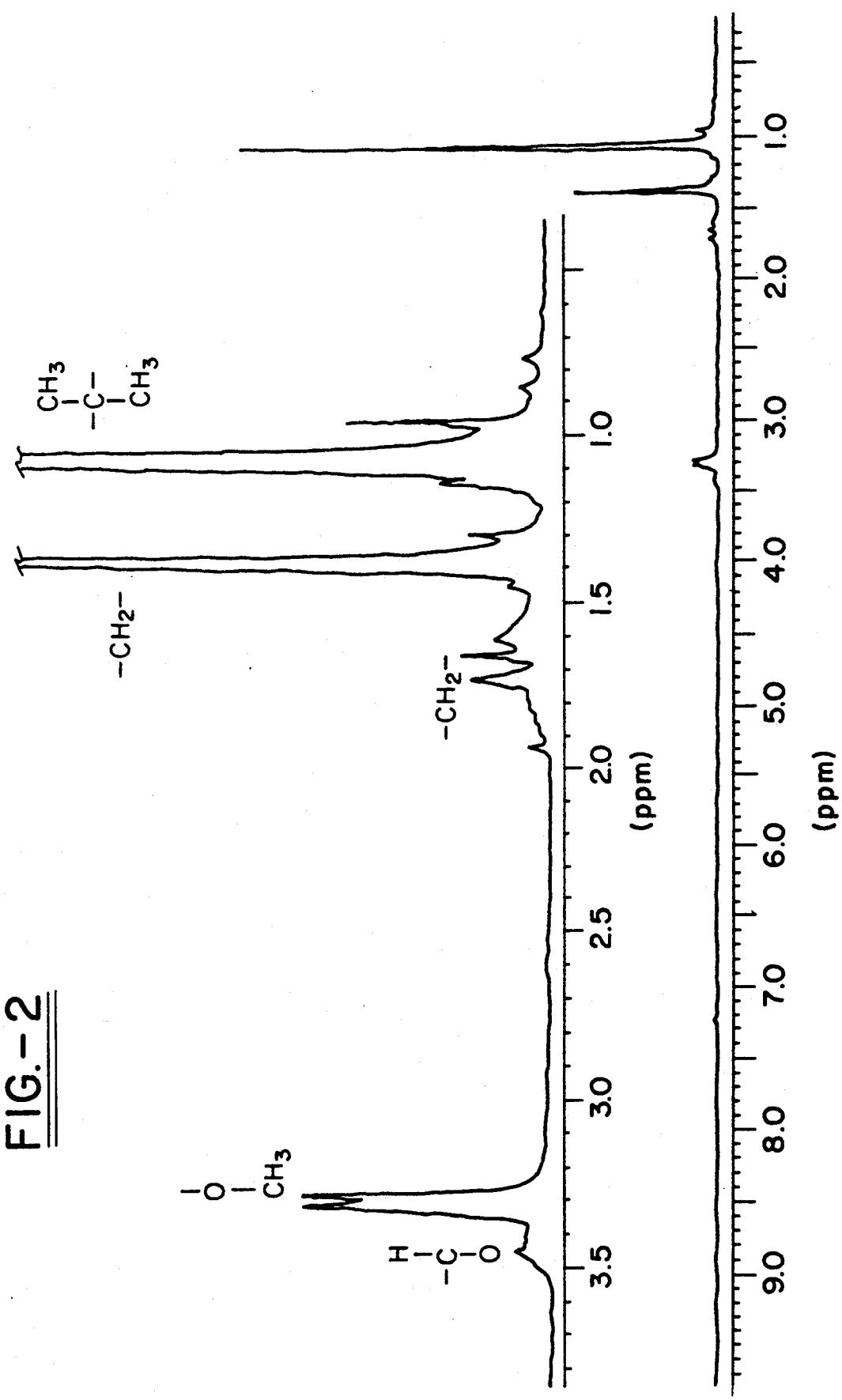
FIG. 2 is a representative $^1$H spectrum of a poly(isobutylene-b-methyl vinyl ether) diblock copolymer.

Quenching the charges with methanol gave stable white emulsions which suggested the presence of amphiphilic products. FIG. 2 shows the $^1$H NMR spectrum of a representative product (i.e., after dissolving in CCl$_4$ and extracting with water/methanol) and indicates the presence of both PIB and PMeVE sequences.

Figure 3:
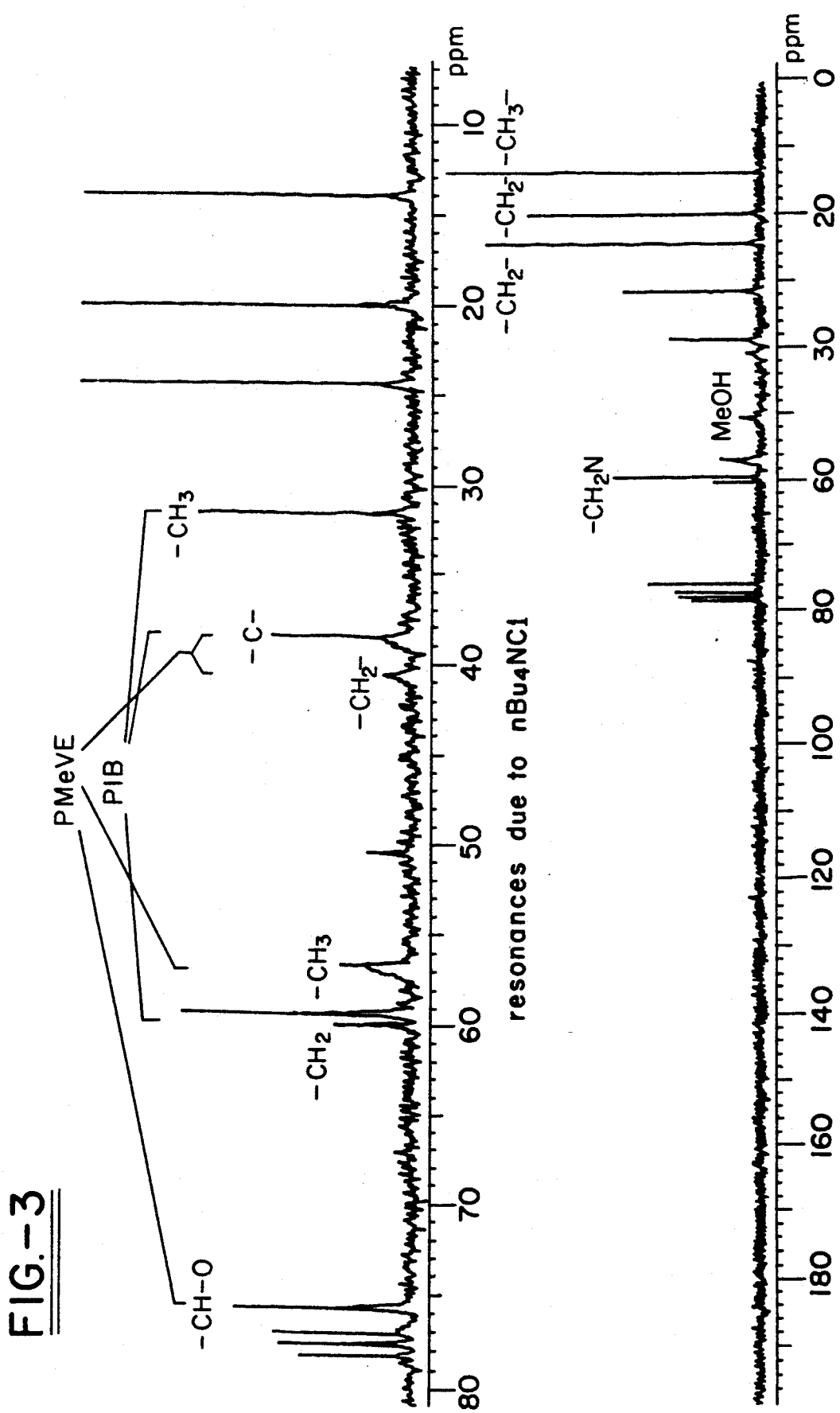
FIG. 3 is a $^{13}$C NMR spectra of the water soluble fraction after purification of poly(isobutylene-b-methyl vinyl ether).

Additional support for the anticipated blocking was obtained by solubility studies and by $^{13}$C NMR analysis of the water soluble fraction of the product, shown in FIG. 3. Thus the product formed hazy solutions in methanol and water (good solvents for PMeVE); pentane and hexane (good solvents for PIB), but dissolved in THF (good solvent for both PIB and PMeVE) as indicated by FIG. 3. The $^{13}$C NMR spectrum of the water soluble fraction showed evidence for PIB sequences.

Blocking of MeVE from Living PIB⊕ by Sequential Monomer Addition

According to the data in Table I, irrespective of the polymerization time and MeVE concentration, the amount and molecular weight of the PMeVE blocks remain the same, within experimental error. Without being held to any theory in particular, it is postulated that crossover and subsequent blocking of MeVE from PIB⊕ are controlled by the presence of available TiCl$_4$ in the charge, and specifically, that MeVE incorporation occurs by MeVE·TiCl$_4$ complexes.

The existence of complexes between TiCl$_4$ and O-containing compounds, particularly etherates, is known. In line with the literature, the rapid formation of 1:1 or 1:2 MeVE·TiCl$_4$ complexes was expected; however the data in Table I are insufficient to distinguish these two stoichiometries.

EXAMPLES 3

Two series of experiments were carried out to further develop the MeVE incorporation and to examine the stoichiometry of these MeVE·TiCl$_4$ complexes. In the first series of experiments charges were prepared containing the living PIB⊕ block to which were added relatively large amounts of MeVE. The effect of the addition of increasing amounts of TiCl$_4$ upon diblock yield and molecular weight were studied. Table III details reaction conditions and reagent concentrations used.

TABLE III

Blocking MeVE from Living PIB⊕ Block
(Orienting experiments with TiCl$_4$ addition*)

| | TiCl$_4$ added (mole × $10^{-3}$) | $W_p$ (g) | $M_n$ | PMeVE contents (wt %) calcd. MeVE·TiCl$_4$ | 2MeVE·TiCl$_4$ | PMeVE content by NMR (mole %) | by GPC (wt %) |
|---|---|---|---|---|---|---|---|
| 0** | — | 0.352 | 1250 | — | — | — | — |
| 1 | — | 0.576 | 1900 | 19.2 | 34.6 | 39.0 | 34.2 |
| 2 | 1.48 | 0.729 | 2100 | 32.3 | 50.0 | 43.3 | 40.5 |
| 3 | 2.59 | 0.781 | 2800 | 47.1 | 64.7 | 44.0 | 55.3 |
| 4 | 4.00 | 0.795 | 2500 | 60.5 | 75.7 | 41.0 | 50.0 |
| 5 | 5.50 | 1.246 | 4200 | 70.7 | 84.7 | 56.0 | 70.3 |

*Addition sequence of reagents in a series of six reactors:
CH$_2$Cl$_2$/n-C$_6$H$_{14}$ = (60/40 v/v)

TABLE III-continued

Blocking MeVE from Living PIB⊕ Block
(Orienting experiments with TiCl₄ addition*)

| TiCl₄ added (mole × 10⁻³) | $W_p$ (g) | $M_n$ | PMeVE contents (wt %) calcd. | | PMeVE content | |
|---|---|---|---|---|---|---|
| | | | MeVE.TiCl₄ | 2MeVE.-TiCl₄ | by NMR (mole %) | by GPC (wt %) |

[TMPCl] = 2.7 × 10⁻⁴ mole
[n-Bu₄NCl] = 1.85 × 10⁻³ mole
[IB] = 6.43 × 10⁻³ mole
[TiCl₄] = 3.7 × 10⁻³ mole at −80° C., 8 min
[MeVE] = 1.4 × 10⁻² mole added to reactors 1-5
**Starting PIB⊕ block prior to MeVE addition Sample 0 (control) was obtained with the TMPCl/TiCl₄/n-Bu₄NCl/IB system in the absence of MeVE, and gives the weight and $\overline{M}_n$ of the first PIB block formed (columns 3 and 4). Sample 1 shows the amount and molecular weight of the initial living PIB-b-PMeVE diblock that formed upon the addition of a large excess of MeVE. Note that only a small fraction of the added MeVE was consumed by blocking. Samples 2-5 show the amounts and molecular weights of the diblocks formed upon the addition of successive aliquots of TiCl₄. The amount and molecular weight of the PIB-b-PMeVE increase upon TiCl₄ additions.

Table III also shows the composition (PMeVE content) of the PIB-b-PMeVEs determined by ¹H NMR spectroscopy and GPC, and the expected compositions of the diblocks assuming monomer incorporation via MeVE·TiCl₄ or 2MeVE·TiCl₄ complexes. This data cannot conclusively distinguish between these two alternatives.

EXAMPLE

Figure 4:
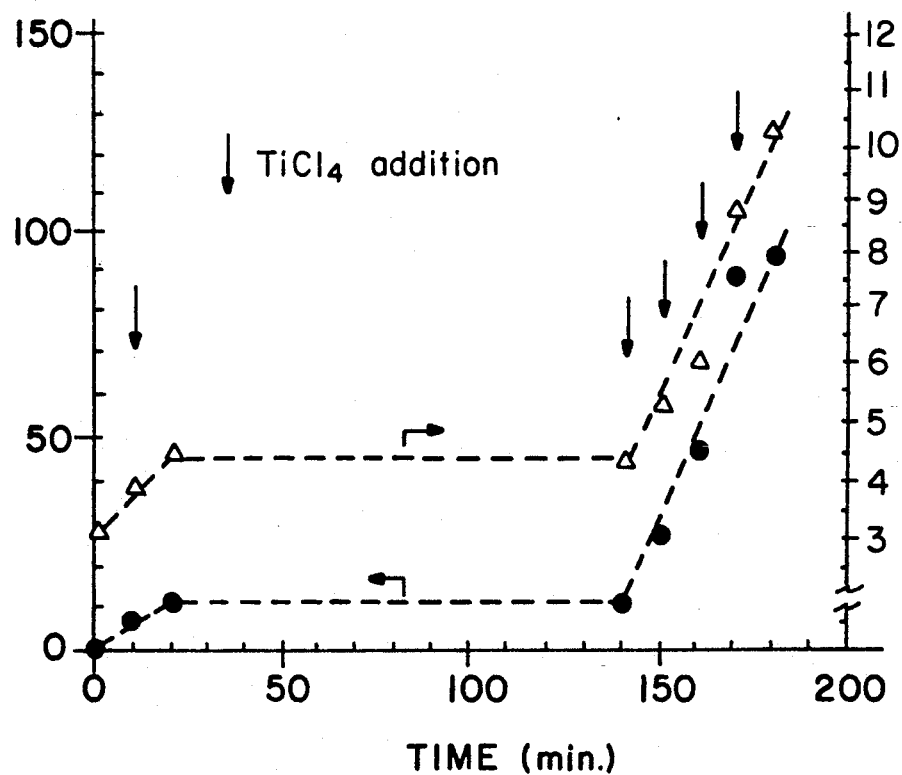
FIG. 4 is a plot of conversion of methyl vinyl ether and molecular weight vs. time. The experimental conditions employed in the polymerization were.

Another series of experiments were carried out to amplify the role MeVE incorporation plays in MeVE·TiCl₄ (stoichiometry unspecified) complexes. In these experiments a series of aliquots of TiCl₄ were added to a stirred reactor containing a charge of living PIB⊕ block plus a large quantity of MeVE, and the amount ($W_p$) and molecular weight ($\overline{M}_n$) of the growing diblock were determined as a function of the aliquots of TiCl₄ added. FIG. 4 shows the MeVE conversion and PIB-b-PMeVE molecular weight versus time profiles obtained. Specifically, the experiment started by producing a living PIB⊕ block targeted for $\overline{M}_n \sim 3000$ (TMPCl/TiCl₄/n-Bu₄NCl/IB/CH₂Cl₂/n-C₆H₁₄/−80° C. /8 min.).

After having withdrawn a sample to ascertain the formation of the targeted PIB molecular weight ($\overline{M}_n = 3100$, see data point at 0 time), a relatively large quantity of MeVE was added to the living charge. After 10 min. of stirring a sample was withdrawn to probe for the amount of MeVE converted and the molecular weight of the diblock. As shown by the data points at 10 minutes, 7% of the added MeVE was converted and the molecular weight rose to 3900. This conversion and molecular weight increase is due to the incorporation of MeVE·TiCl₄ into the living diblock chain; the MeVE·TiCl₄ arose from the residual TiCl₄ that remained after the first living PIB⊕ block was formed plus a fraction of the MeVE added (note that [TiCl₄] > [n-Bu₄NCl]).

Immediately after the withdrawal of the 10 min. sample, the first aliquot of TiCl₄ was added and the charge stirred for 10 mins. At this point the third sample was withdrawn (see conversion and molecular weight at 20 min.) which showed ∼12% MeVE conversion and diblock molecular weight ∼4400. Subsequently the charge was stirred for 120 mins at which point another sample was taken. According to this sample (140 mins), neither the conversion nor the molecular weight molecular weight have changed during this quiescent stirring period, although a large amount of unreacted MeVE was still available in the charge.

At this point a fresh aliquot of TiCl₄ was added, the system stirred for 10 mins and sampled. According to this, the 150 min, sample MeVE conversion increased ∼28% and the diblock molecular weight to ∼5300. From this point on successive aliquots of TiCl₄ were added tot he living charge, stirred for 10 mins, and a sample taken. As indicated by the plots in FIG. 4 both the MeVE conversion and diblock molecular weight increased in proportion with the TiCl₄ added. The dispersities of the samples were in rage $\overline{M}_w/\overline{M}_n = 1.4$–1.7. These data clearly indicate that MeVE incorporation is controlled by TiCl₄, that is most likely by MeVe·TiCl₄ complexes and that "free" MeVE does not add to the living block.

FIG. 5 shows the diblock molecular weight ($\overline{M}_n$) versus gram of diblock formed, and the number of moles of living species (N) versus gram of diblock formed plots, respectively. The experimental points are within experimental error of the theoretical values (solid lines) indicating that the number of living chains remains constant and equal to the initial initiator concentration, $[I]_o = [TMPCl]_o = 9.3 \cdot 10^{-4}$ mole, throughout the experiment. The de facto "monomer", i.e.. the MeVE·TiCl₄ complex, is formed in situ in the charge and is essentially quantitatively incorporated into the living PMeVE block upon TiCl₄ addition. After the last TiCl₄ addition the conversion of MeVE was virtually complete. According to this evidence the block copolymerization of IB and MeVE is living under the conditions employed.

FIG. 6 shows the relationship between the molecular weight of the diblocks formed and the amount of TiCl₄ introduced. The upper broken line indicates this relationship assuming the presence of a 2MeVE·TiCl₄ complex, and the lower one shows the same relationship assuming MeVE·TiCl₄. The experimental data fall between these limits, so the stoichiometry of the active complex remains obscure. It is conceivable that both stoichiometries may coexist and that the complexes are connected by a rapid equilibrium.

EXAMPLE 5

A series of PIB-b-PMeVEs of potential interest as emulsifying agents have been synthesized. Table IV shows the results of three representative diblock syntheses.

TABLE IV

Synthesis of PIB-b-PMeVE by Sequential Addition of TiCl$_4$

| [n-Bu$_4$NCl] ($10^{-3}$) mole | [TMPCl] ($10^{-4}$) mole | [IB] ($10^{-2}$) mole | [TiCl$_4$] ($10^{-3}$) mole | [MeVE] ($10^{-2}$) mole | [TiCl$_4$] $10^{-3}$ mole | $\overline{M}_n$ of PIB seg | $\overline{M}_n$** of PMeVE expected | $\overline{M}_n$ of the PIB-b-PMeVE diblock | $\overline{M}_w/\overline{M}_n$ |
|---|---|---|---|---|---|---|---|---|---|
| 1.8 | 5.3 | 1.28 | 3.7 | 1.4 | 3.7 | 1300 | 1200 | 2600 | 1.37 |
| 1.8 | 2.7 | 1.28 | 3.6 | 2.6 | 8.8 | 2600 | 4500 | 5000 | 1.39 |
| 1.8 | 2.7 | 2.5 | 3.7 | 0.76 | 1.7 | 5000 | 1500 | 6500 | 1.65 |

*Block copolymerization in CH$_2$Cl$_2$/n-hexane (60/40 v/v)
**Calculated $\overline{M}_n$ of the PMeVE block assuming 2MeVE.TiCl$_4$ stoichiometry In these experiments, PIB blocks of desirable sequence length ($\overline{M}_n = 1000$–5000) were prepared and subsequently blocked MeVE from the living PIB$\oplus$ by adding predetermined amounts of TiCl$_4$. The PMeVE blocks were targeted to be in the $\overline{M}_n = 1300$–3500 range. The molecular weight of the PMeVE blocks (i.e., the PIB-b-PMeVE diblocks) are within experimental error of the theoretical values.

As anticipated the diblocks were strong nonionic emulsifying agents. For example as emulsion that formed upon dissolving 0.1 g of a PIB-b-PMeVE ($\overline{M}_n = 2600$, 50 wt % PMeVE) in 5 ml methanol-hexane (50/50 v/v), and adding 3 ml water was for several months of storage at room temperature emulsion prepared by using 0.1 g PIB-b-PMeVE $\overline{M}_n = 5000$, 50 wt % PMeVE) in 3 ml hexane plus 2 ml methanol plus 2 ml water, was stable for close to a year.

DISCUSSION

While not wishing to be bound by theory, the fact that TiCl$_4$ is inactive after the incorporation of the MeVE·TiCl$_4$ complex into the polymer chain suggests that the Friedel-Crafts acid remains attached to the ether unit in the polymer. This would explain the need for the use of stoichiometric (not catalytic) amounts of TiCl$_4$. The Friedel-Crafts acid, however can be readily removed by washing the diblock with nucleophiles (water, methanol).

The above data indicate that TiCl$_4$ is not a coinitiator in these polymerizations but rather a "monomer activator", i.e., it activates the MeVE by complexation.

While in accordance with the patent statutes, a best mode and preferred embodiment have been described in detail, the invention is not limited thereto, rather the invention is measured by the scope of the attached claims.

What is claimed is:

1. A process for the synthesis of an amphiphilic block polymer of unimodal $\overline{M}w/\overline{M}n$ molecular weight distribution wherein a crossover reaction from a hydrophobic block polymer to a hydrophobic block polymer occurs essentially quantitatively and without subsequent degradation by dealcoholation, comprising the steps of:
   (a) polymerizing a hydrophobic monomer to the hydrophobic block polymer by a living carbocationic polymerization; and
   (b) sequentially adding a hydrophilic monomer to the hydrophobic block polymer in the present of a salt, the addition occurring subsequent to the incorporation of a monomer activator which forms a complex with the hydrophobic monomer prior to the addition of the hydrophilic monomer to the hydrophobic block polymer.

2. The process of claim 1 wherein the salt decreases the ionicity of the system and thereby avoids a dealcoholation reaction.

3. The process of claim 2 wherein the salt is a quaternary salt of formula:

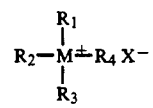

wherein

R$_1$–R$_4$ is selected from a group consisting of alkyl, alkenyl, aryl, alkaryl, aralkyl, and cycloalkyl radicals, and R$_1$–R$_4$ are the same or different;

M is selected from the group consisting of nitrogen and phosphorus; and

X is selected from the group consisting of chloride and bromide.

4. The process of claim 3 wherein at least one alkyl group is n-butyl.

5. The process of claim 4 wherein the quaternary salt is tetra-n-butylammonium halide.

6. The process of claim 1 wherein the monomer activator is a Friedel-Crafts halide.

7. The process of claim 6 wherein the Friedel-Crafts halide is selected from the group consisting of TiCl$_4$, BCl$_3$, SnCl$_4$, SbCl$_5$, ZnCl$_2$, BBr$_3$, TiBr$_4$, SnBr$_4$, SbBr$_5$, ZnBr$_2$, R$_x$AlX$_{(3-x)}$, and R$_4$N$\oplus$MtX$\ominus_{(n+1)}$ wherein R is selected from a group consisting of alkyl alkenyl, aryl, alkaryl, aralkyl, cycloalkyl moieties and cycloalkyl radicals, and R is the same or different;

Mt is a transition metal;

X is a halide selected from the group consisting of chloride and bromide;

$x$ is an integer from 1 to 3; and $n$ is an integer sufficient to satisfy the valence of the transition metal.

8. The process of claim 1 wherein the hydrophobic monomer is an olefinic monomer.

9. The process of claim 8 wherein the olefinic monomer is isobutylene.

10. The process of claim 1 wherein the hydrophilic monomer is an alkyl vinyl ether.

11. The process of claim 10 wherein the alkyl vinyl ether is selected from the group consisting of methyl vinyl ether, ethyl vinyl ether, isobutyl vinyl ether, and β-cloroethyl vinyl ether.

12. A process for the synthesis of an amphiphilic block polymer of unimodal $\overline{M}w/e,ovs/M/ n$ molecular weight distribution wherein a crossover reaction from a hydrophobic block polymer to a hydrophilic block polymer occurs essentially quantitatively and without subsequent degradation by dealcoholation, comprising the steps of:

(a) polymerizing isobutylene to the hydrophobic block polymer by a living carbocationic polymerization; and (b) sequentially adding an alkyl vinyl ether monomer to the hydrophobic block polymer in the present of a quaternary ammonium salt, the addition occurring subsequent to the incorporation of a monomer activator which forms a complex with the alkyl vinyl ether monomer prior to the addition of the alkyl vinyl ether monomer to the hydrophobic clock polymer.

13. The process of claim 12 wherein the alkyl vinyl ether is methyl vinyl ether.

14. The process of claim 13 wherein the monomer activator is $TiCl_4$.

15. A amphiphilic block copolymer of unimodal $\overline{M}_w/\overline{M}_n$ molecular weight distribution wherein a crossover reaction from a hydrophobic block polymer to a hydrophilic block polymer occurs essentially quantitatively and without subsequent degradation by dealcoholation, comprising:

(a) a hydrophobic block; and (b) a hydrophilic block.

16. The block copolymer of claim 15 wherein the hydrophobic monomer is an olefinic monomer.

17. The block copolymer of claim 16 wherein the olefinic monomer is isobutylene.

18. The block copolymer of claim 15 wherein the hydrophilic monomer is an alkyl vinyl ether.

19. The block copolymer of claim 18 wherein the alkyl vinyl ether is selected from the group consisting of methyl vinyl ether, ethyl vinyl ether, isobutyl vinyl ether, and $\beta$-cloroethyl vinyl ether.

20. An amphiphilic block copolymer of unimodal $\overline{M}_w/\overline{M}_n$ molecular weight distribution wherein a crossover reaction from a hydrophobic block polymer to a hydrophilic block polymer occurs essentially quantitatively and without subsequent degradation by dealcoholation, comprising:

(a) a hydrophobic block; and (b) a hydrophilic block wherein the molecular weight distribution as measured by the ratio $\overline{M}_w/\overline{M}_n$ is between 1.4–1.7.

* * * * *